(12) United States Patent
Yanagisawa et al.

(10) Patent No.: US 6,251,811 B1
(45) Date of Patent: Jun. 26, 2001

(54) FUNNEL GLASS FOR A CATHODE RAY TUBE

(75) Inventors: Osamu Yanagisawa, Yokohama; Yuichi Kuroki; Ryousuke Akagi, both of Funabashi, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/343,522

(22) Filed: Jun. 30, 1999

(30) Foreign Application Priority Data

Jul. 10, 1998 (JP) .................................................. 10-196193

(51) Int. Cl.$^7$ ........................... C03C 3/078; C03C 3/085; C03C 3/087; C03C 3/102
(52) U.S. Cl. ................................. 501/60; 501/69; 501/70; 501/72; 313/480
(58) Field of Search ................................. 501/60, 69, 70, 501/72; 313/480

(56) References Cited

U.S. PATENT DOCUMENTS

| | | | |
|---|---|---|---|
| 3,819,972 | * | 6/1974 | Sanner . |
| 3,925,089 | * | 12/1975 | Houben .................................. 501/31 |
| 3,987,330 | * | 10/1976 | Shell . |
| 4,065,697 | * | 12/1977 | Steierman . |
| 4,366,252 | * | 12/1982 | Weaver .................................. 501/60 |
| 4,520,115 | | 5/1985 | Speit et al. . |
| 4,680,503 | * | 7/1987 | Spierings et al. ...................... 501/61 |
| 5,725,627 | | 3/1998 | Piers et al. . |

FOREIGN PATENT DOCUMENTS

| | | |
|---|---|---|
| 0 657 392 | 6/1995 | (EP) . |
| 923 337 | 7/1947 | (FR) . |
| 8-031342 | * 2/1996 | (JP) . |
| 8-290937 | * 11/1996 | (JP) . |
| 8-290940 | * 11/1996 | (JP) . |

* cited by examiner

Primary Examiner—David R Sample
(74) Attorney, Agent, or Firm—Oblon, Spivak, McClelland, Maier & Neustadt, P.C.

(57) ABSTRACT

A funnel glass containing PbO for a cathode ray tube, wherein when the composition is represented by wt % based on oxides, the content of SrO is at least 1.0 wt %, the content of BaO is at least 1.0 wt %, and the ratio of the content of PbO to the total amount of PbO, SrO, BaO, CaO and MgO, is at most 0.69, and whereby the lead elution A of the glass as measured by the following method A is at most 1.0 $\mu$g/cm$^2$, and the X-ray absorption coefficient at a wavelength of 0.6 Å is at least 40 cm$^{-1}$: Method A: The glass is immersed in distilled and deionized water at 90° C. for 20 hours, whereupon the glass is taken out, and the amount of lead in the distilled and deionized water is measured by inductively coupled plasma emission spectrometry, and the measured value of the amount of lead is divided by the surface area of the glass, and the product is taken as the lead elution A.

9 Claims, No Drawings

FUNNEL GLASS FOR A CATHODE RAY TUBE

The present invention relates to a funnel glass for cathode ray tube which is useful for a television receiver, a computer terminal display or the like.

A cathode ray tube is composed of a panel for displaying images, a neck for holding an electron gun and a funnel connecting them. These three sections are prepared separately in desired shapes, respectively, and then bonded to form a cathode ray tube. With a cathode ray tube, in order to illuminate the phosphors coated on the inner surface of the panel, a high voltage is applied to an anode to discharge electrons and irradiate them to the phosphors. At that time, X-rays will be generated, and the glass to be used for a cathode ray tube, is required to have an X-ray absorbing function. However, the glasses of these three sections are required to have different properties in addition to the X-ray absorbing function, and they are accordingly made of glasses having different compositions. Namely, for the panel, in order to shield X-rays generated and to prevent browning by such X-rays, as a component to shield X-rays, SrO or BaO is employed, and PbO is not employed. The funnel is required to have a higher X-ray absorbing function than the panel, and accordingly, as a component to shield X-ray, PbO having a larger X-ray absorbing coefficient than SrO or BaO, is employed in a large amount.

A part of cathode ray tubes after the end of useful life may be recovered and reused, and the rest will be stored as an industrial waste at a controlled site. The cathode ray tubes after the end of useful life stored outdoors, will be exposed to rain water for a long period of time, whereby glass components are likely to elute. Particularly, from a conventional funnel or neck glass containing lead, the lead is likely to elute.

In recent years, in order to cope with the above mentioned lead elution problem, a funnel glass whereby the lead elution into water is small, is desired. In order to reduce the lead elution from the funnel glass for a cathode ray tube into water, JP-A-7-206468 proposes a glass having PbO as one of the main components replaced by $Bi_2O_3$, and JP-A-8-290937 proposes a glass having $TiO_2$ incorporated. However, if the content of $Bi_2O_3$ or $TiO_2$ in the funnel glass is increased, a problem such as depletion of the bismuth or titanium resource or an increase of the production cost, is likely to be brought about, since the production quantity of cathode ray tubes is very large.

Accordingly, it is an object of the present invention to provide a funnel glass which can be used for a funnel glass for a conventional cathode ray tube and which is composed of components which can be quantitatively secured as industrial resources and whereby the lead elution into water is little.

In a first aspect, the present invention provides a funnel glass containing PbO for a cathode ray tube, wherein when the composition is represented by wt % based on oxides, the content of SrO is at least 1.0 wt %, the content of BaO is at least 1.0 wt %, and the ratio of the content of PbO to the total amount of PbO, SrO, BaO, CaO and MgO, is at most 0.69, and whereby the lead elution A of the glass as measured by the following method A is at most 1.0 $\mu g/cm^2$, and the X-ray absorption coefficient at a wavelength of 0.6 Å is at least 40 $cm^{-1}$:

Method A: The glass is immersed in distilled and deionized water at 90° C. for 20 hours, whereupon the glass is taken out, and the amount of lead in the distilled and deionized water is measured by inductively coupled plasma spectrometry, and the measured value of the amount of lead is divided by the surface area of the glass, and the product is taken as the lead elution A.

Further, in a second aspect, the present invention provides a funnel glass containing PbO for a cathode ray tube, wherein when the composition is represented by wt % based on oxides, the content of SrO is at least 1.0 wt %, the content of BaO is at least 1.0 wt %, and the content of $ZrO_2$ is at least 0.3 wt %, and whereby the lead elution B of the glass as measured by the following method B is at most 4.0 $\mu g/cm^2$, and the X-ray absorption coefficient at a wavelength of 0.6 Å is at least 40 $cm^{-1}$:

Method B: The glass is immersed in distilled and deionized water at 90° C. for 20 hours, whereupon the glass is taken out, concentrated nitric acid is added to this distilled and deionized water and then the amount of lead is measured by inductively coupled plasma spectrometry, and the measured value of the amount of lead is divided by the surface area of the glass, and the product is taken as the lead elution B.

Now, the present invention will be described in detail with reference to the preferred embodiments.

Referring to the first aspect of the present invention, the lead elution A represents the amount of lead which elutes from the glass into distilled and deionized water when the glass is immersed in the distilled and deionized water at 90° C. for 20 hours and which is represented by a unit of $\mu g/cm^2$ as the weight of lead eluting per a unit surface area of the glass. Here, the distilled and deionized water is prepared by once distilling city water and further passing it through an ion exchange membrane. The above amount of lead is measured by inductively coupled plasma spectrometry (IPC) upon expiration of 7 days after completion of the immersion of the glass.

The lead elution A of the funnel glass for a cathode ray tube according to the first aspect of the present invention (hereinafter referred to simply as the glass according to the first aspect) is at most 1.0 $\mu g/cm^2$, which is small as compared with the lead elution Å (1.2 $\mu g/cm^2$) of the conventional funnel glass for a cathode ray tube (hereinafter referred to simply as the conventional glass) and thus is superior from the viewpoint of the environmental protection. The lead elution A is preferably at most 0.9 $\mu g/cm^2$, more preferably at most 0.7 $\mu g/cm^2$.

In the glass according to the first aspect of the present invention, PbO, SrO and BaO are essential, but CaO and MgO are not essential components.

When the composition of the glass according to the first aspect is represented by wt % based on oxides, if the ratio of the content of PbO to the total amount of PbO, SrO, BaO, CaO and MgO, exceeds 0.69, the lead elution is likely to be too much. The ratio is preferably at most 0.67.

In the second aspect of the present invention, the lead elution B is measured as follows.

(1) The glass (size: about 5 cm×5 cm, thickness: about 3 mm) is immersed in 100 cc of distilled and deionized water at 90° C. for 20 hours.

(2) From this distilled deionized water, the glass is taken out, and within 24 hours, 0.3 cc of concentrated nitric acid is added to the water.

(3) The amount of lead in the distilled and deionized water is measured by IPC upon expiration of 7 days from the completion of the immersion of the glass, and the measured amount is taken as the weight of the eluted lead.

(4) The weight of the eluted lead per a unit surface area of the glass is taken as the lead elution B (unit: $\mu g/cm^2$).

The lead elution B of the funnel glass for a cathode ray tube according to the second aspect of the present invention (hereinafter referred to simply as the glass according to the second aspect) is at most 4.0 μg/cm², which is small as compared with the lead elution B (4.6 μg/cm²) of the conventional glass and thus is superior from the viewpoint of the environmental protection. The lead elution B is preferably at most 3.6 μg/cm², more preferably at most 3.0 μg/cm², most preferably at most 2.3 μg/cm².

When the lead elution A and the lead elution B from the same glass are compared, the lead elution B is usually larger than the lead elution A. The reason may be explained as follows.

In the measurement of the lead elution A, lead eluted from the glass into the distilled deionized water, will gradually precipitate in the form of a hydroxide as the time passes from the completion of immersion of the glass to the measurement by IPC, and the lead in the form of a hydroxide will not be measured by IPC. On the other hand, in the measurement of the lead elution B, nitric acid is added within 24 hours from the completion of immersion of the glass, whereby the conversion of lead to the hydroxide will be suppressed. As a result, the amount of lead measured by IPC will be larger in the case of the lead elution B than in the case of the lead elution A.

When the composition of the glass according to the second aspect of the present invention is represented by wt % based on oxides, if the content of $ZrO_2$ is less than 0.3 wt %, the lead elution B tends to be too large. The content of $ZrO_2$ is preferably at least 0.4 wt %, more preferably at least 0.5 wt %, further preferably at least 1 wt %, most preferably at least 2 wt %. Further, it is preferably at most 4 wt %. If it exceeds 4 wt %, the X-ray absorbing function is likely to decrease. It is more preferably at most 3.5 wt %, most preferably at most 3 wt %.

The X-ray absorption coefficient at a wavelength of 0.6 Å of the glasses according to the first and second aspects of the present invention (which will be generally referred to as the present invention), is at least 40 cm$^{-1}$, and thus, the glasses of the present invention have a good X-ray absorbing function. The X-ray absorption coefficient is preferably at least 50 cm$^{-1}$, more preferably at least 60 cm$^{-1}$, most preferably at least 65 cm$^{-1}$. The X-ray absorption coefficient $\mu$ can be calculated by the following equation:

$$\mu = \Sigma(f_i \times W_i) \times \rho \div 100$$

where $f_i$ is the content (unit: wt %) of each component constituting the glass, as represented as an oxide, $W_i$ is the mass absorption coefficient (unit: cm²/g) of such an oxide at a wavelength of 0.6 Å, and $\rho$ is the density (unit: g/cm³) of the glass.

When the composition of the glass of the present invention is represented by wt % based on oxides, if the content of SrO is less than 1 wt %, the effect for reducing the lead elution tends to be small. The content of SrO is preferably at least 1.5 wt %, more preferably at least 2 wt %, most preferably at least 3 wt %.

When the composition of the glass of the present invention is represented by wt % based on oxides, if the content of BaO is less than 1 wt %, the alkali resistance of the glass tends to be low, and the weather resistance tends to be poor. The content of BaO is preferably at least 1.5 wt %, more preferably at least 2 wt %, most preferably at least 3 wt %.

The softening point of the glass of the present invention is preferably at least 650° C. If the softening point is lower than 650° C., the glass is likely to be deformed when it is fused with the neck or when it is frit-sealed with the panel. The softening point is more preferably at least 655° C., most preferably at least 660° C. On the other hand, the softening point is preferably at most 680° C. If it exceeds 680° C., the viscosity increase will be remarkable along with the temperature rise, whereby molding tends to be difficult. The softening point is more preferably at most 670° C.

The average linear expansion coefficient from 0 to 300° C. of the glass of the present invention (hereinafter referred to simply as a thermal expansion coefficient) is preferably at least 94×10$^{-7}$/° C. and at most 99×10$^{-7}$/° C. If it is less than 94×10$^{-7}$/° C. or more than 99×10$^{-7}$/° C., the residual strain is likely to form between the glass and the neck or between the glass and the frit-seal. The thermal expansion coefficient is more preferably at least 95×10$^{-7}$/° C. and at most 98×10$^{-7}$/° C.

The devitrification temperature (the temperature at which crystals precipitate) of the glass of the present invention is preferably at most 1,100° C., more preferably at most 1,050° C.

For the glass according to the first aspect of the present invention, the composition as represented by wt % based on oxides, consists preferably of the following components:

| | |
|---|---|
| $SiO_2$ | 45 to 60 wt %, |
| $Al_2O_3$ | 0 to 6 wt %, |
| $Na_2O$ | 3 to 11 wt %, |
| $K_2O$ | 3 to 11 wt %, |
| PbO | 5 to 24 wt %, |
| SrO | 1 to 14 wt %, |
| BaO | 1 to 21 wt %, |
| CaO | 0 to 5 wt %, |
| MgO | 0 to 5 wt %, |
| ZnO | 0 to 2 wt %, |
| $ZrO_2$ | 0 to 4 wt %, |
| $TiO_2$ | 0 to 0.9 wt %, |
| $Sb_2O_3$ | 0 to 1 wt %. |

More preferably, the composition represented by wt % based on oxides, consists essentially of the following components:

| | |
|---|---|
| $SiO_2$ | 49 to 55 wt %, |
| $Al_2O_3$ | 0.1 to 5 wt %, |
| $Na_2O$ | 4 to 10 wt %, |
| $K_2O$ | 4 to 10 wt %, |
| PbO | 15 to 24 wt %, |
| SrO | 2 to 9 wt %, |
| BaO | 2 to 11 wt %, |
| CaO | 0 to 4 wt %, |
| MgO | 0 to 3 wt %, |
| ZnO | 0 to 1 wt %, |
| $ZrO_2$ | 0 to 4 wt %, |
| $TiO_2$ | 0 to 0.9 wt %, |
| $Sb_2O_3$ | 0 to 1 wt %. |

Now, the above compositions will be described.

If the content of $SiO_2$ is less than 45 wt %, the chemical durability tends to be poor, and the lead elution is likely to increase. It is preferably at least 49 wt %. On the other hand, if it exceeds 60 wt %, workable temperature range of the glass tends to be narrow, and transparency of the glass is likely to be lost due to precipitation of crystals in the glass. It is preferably at most 57 wt %, more preferably at most 55 wt %. Here, the workable temperature range is represented by a value obtained by deducting the devitrification temperature from the temperature at which the glass viscosity becomes 10$^4$ poise (the index temperature at which the molding operation of the glass is initiated), and if it is small, the possibility that transparency of the glass will be lost due to precipitation of crystals, will increase.

$Al_2O_3$ is not an essential component, but may be incorporated up to 6 wt % in order to improve the alkali resistance. It is more preferably at least 0.5 wt %. If it exceeds 6 wt %, the softening point tends to be too high, whereby the viscosity increase tends to be remarkable along with the temperature rise, and molding tends to be difficult. It is more preferably at most 5 wt %, most preferably at most 2 wt %.

If the content of $Na_2O$ is less than 3 wt %, the softening point tends to be too high, and the viscosity increase tends to be remarkable along with the temperature rise and molding tends to be difficult. It is preferably at least 4 wt %, more preferably at least 6 wt %. On the other hand, if it exceeds 11 wt %, the electrical resistance tends to be low. It is preferably at most 10 wt %, more preferably at most 8 wt %.

$K_2O$ is incorporated in an amount of at least 3 wt % for the purpose of adjusting the thermal expansion coefficient and increasing the electrical resistance due to a mixed alkali effect. It is preferably at least 4 wt %, more preferably at least 5 wt %. However, if it exceeds 11 wt %, the thermal expansion coefficient tends to be too high, and it tends to be difficult to carry out fusion with the neck or frit-sealing with the panel. It is preferably at most 10 wt %, more preferably at most 9 wt %.

PbO is an essential component to improve the X-ray absorbing function. If it is less than 5 wt %, it will be necessary to increase the content of BaO, SrO or the like in order to obtain the predetermined X-ray absorbing function, whereby the devitrification temperature tends to be high. It is preferably at least 14 wt %, more preferably at least 15 wt %. On the other hand, if it exceeds 24 wt %, the lead elution is likely to increase. It is preferably at most 21 wt %, more preferably at most 20 wt %.

If the content of SrO exceeds 14 wt %, the devitrification temperature tends to be too high, and crystals are likely to precipitate in the glass, whereby the transparency is likely to be lost. It is preferably at most 9 wt %.

If the content of BaO exceeds 21 wt %, the devitrification temperature tends to be too high, and crystals are likely to precipitate in the glass, whereby the transparency is likely to be lost. It is preferably at most 11 wt %.

CaO is not an essential component, but may be incorporated up to 5 wt % to adjust the softening point. If it exceeds 5 wt %, the softening point tends to be too high, and the viscosity increase tends to be remarkable along with the temperature rise, whereby molding tends to be difficult. It is more preferably at most 4 wt %.

MgO is not an essential component, but may be incorporated up to 5 wt % to adjust the softening point. If it exceeds 5 wt %, the softening point tends to be too high, and the viscosity increase tends to be remarkable along with the temperature rise, whereby molding tends to be difficult. It is more preferably at most 3 wt %.

ZnO is not an essential component. Its X-ray absorbing function is low as compared with PbO, but it is a component having a moderate X-ray absorbing function. Accordingly, when substituted for PbO, it provides an effect of suppressing the lead elution while maintaining the X-ray absorbing function to some extent. If it exceeds 2 wt %, the X-ray absorbing function tends to be too low, and X-rays are likely to leak. It is more preferably at most 1 wt %.

$ZrO_2$ is not an essential component. Its X-ray absorbing function is low as compared with PbO, but it is a component having a moderate X-ray absorbing function. Accordingly, when substituted for PbO, it has an effect of suppressing the lead elution while maintaining the X-ray absorbing function to some extent. If it exceeds 4 wt %, the X-ray absorbing function tends to be too low, and X-rays are likely to leak. It is more preferably at most 2 wt %. On the other hand, it is preferably incorporated in an amount of at least 0.3 wt %, since the X-ray absorbing wavelength of Zr is shorter than Pb. More preferably it is at least 0.4 wt %, most preferably at least 0.5 wt %.

$TiO_2$ is not an essential component, but it is a component for adjusting the viscosity of glass at a temperature of at least 1,200° C. If it exceeds 0.9 wt %, the workable temperature range of glass tends to be narrow, and crystals are likely to precipitate in the glass, whereby the transparency is likely to be lost. It is more preferably at most 0.7 wt %, most preferably at most 0.5 wt %.

$Sb_2O_3$ is not an essential component, but has a refining effect to reduce bubbles in molten glass. Even if it exceeds 1.0 wt %, such a clarifying effect will not further increase. Namely, the clarifying effect will be saturated.

The composition of the glass according to the first aspect of the present invention preferably consists essentially of the above components. However, other components such as $Fe_2O_3O$ may be contained within a range not to impair the purpose of the present invention. The total amount of such other components is preferably at most 5 wt %. $As_2O_3$ has the same function as $Sb_2O_3$, but it is likely to create an environmental problem. Accordingly, its use is not desirable.

For the glass according to the second aspect of the present invention, the composition as represented by wt % based on oxides, consists preferably of the following components:

| | |
|---|---|
| $SiO_2$ | 45 to 60 wt %, |
| $Al_2O_3$ | 0 to 6 wt %, |
| $Na_2O$ | 3 to 11 wt %, |
| $K_2O$ | 3 to 11 wt %, |
| PbO | 5 to 24 wt %, |
| SrO | 1 to 14 wt %, |
| BaO | 1 to 21 wt %, |
| CaO | 0 to 5 wt %, |
| MgO | 0 to 5 wt %, |
| ZnO | 0 to 2 wt %, |
| $ZrO_2$ | 0.3 to 4 wt %, |
| $TiO_2$ | 0 to 0.9 wt %, |
| $Sb_2O_3$ | 0 to 1 wt %. |

Now, the above composition will be described.

If the content of $SiO_2$ is less than 45%, the chemical durability tends to be poor, and the lead elution is likely to increase. It is preferably at least 49 wt %. On the other hand, if it exceeds 60 wt %, the workable temperature range of the glass tends to be narrow, and transparency of the glass is likely to be lost due to precipitation of crystals in the glass. It is preferably at most 57 wt %, more preferably at most 56 wt %.

If the content of SrO exceeds 14 wt %, the devitrification temperature tends to be too high, and crystals are likely to precipitate in the glass, whereby the transparency is likely to be lost. It is preferably at most 9 wt %, more preferably at most 5 wt %.

If the content of BaO exceeds 21 wt %, the devitrification temperature tends to be too high, and crystals are likely to precipitate in the glass, whereby the transparency is likely to be lost. It is preferably at most 11 wt %, more preferably at most 6 wt %.

CaO is not an essential component, but may be incorporated up to 5 wt % to adjust the softening point. If it exceeds 5 wt %, the softening point tends to be too high, and the viscosity increase tends to be remarkable along with the temperature rise, whereby molding tends to be difficult. It is more preferably at most 4 wt %, most preferably at most 2 wt %.

With respect to $Al_2O_3$, $Na_2O$, $K_2O$, PbO, MgO, ZnO, $TiO_2$ and $Sb_2O_3$, the same as described with respect to the composition of the glass according to the first aspect of the present invention, will apply, and repetition of the description will be omitted.

The composition of the glass according to the second aspect of the present invention preferably consists essentially of the above components. However, other components such as $Fe_2O_3$ may further be incorporated within a range not to impair the purpose of the present invention. The total amount of such other components is preferably at most 5 wt %. $As_2O$ has the same effect as $Sb_2O_3$. However, it is likely to create an environmental problem, and its use is not desirable.

Now, the present invention will be described in further detail with reference to Examples. However, it should be understood that the present invention is by no means restricted to such specific Examples.

Reagent raw materials were blended to have a composition represented by wt % of from $SiO_2$ to $Sb_2O_3$ in Table 1 and to obtain 500 g of glass. Then, the blended material was melted at 1,500° C. by means of a platinum crucible and further stirred at that temperature for one hour to homogenize it, followed by refining for one hour. After refining, the molten glass was cast in the form of a plate having a width of 5 cm, followed by annealing.

The lead elution A or the lead elution B was measured as follows.

A specimen having a size of about 5 cm×5 cm and a thickness of about 7 mm, cut out from the above mentioned matrix glass of a plate shape, is subjected to cutting and polishing to obtain a specular surface thereby to obtain a sample having a size of about 5 cm×5 cm and a thickness of about 3 mm. The sample was washed and dried, and then put into about 100 cc of distilled and deionized water in a container (volume: 500 cc, diameter: about 8 cm, height: about 11 cm) made of PFA (tetrafluoroethylene-perfluorovinyl ether copolymer) and immersed at 90° C. for 20 hours.

Lead eluted from this sample glass into the distilled and deionized water (the dipping liquid), was quantitatively analyzed by means of IPC upon expiration of 7 days after completion of the immersion of the glass, and the product obtained by dividing the analyzed value by the surface area of the sample, was taken as the lead elution A.

On the other hand, within 24 hours after taking out the sample glass from this distilled and deionized water (the dipping liquid), concentrated nitric acid was added in an amount of 0.3 cc to the dipping liquid, and lead in the dipping liquid was quantitatively analyzed by means of IPC upon expiration of 7 days from the completion of the immersion of the glass, and the product obtained by dividing the analyzed value by the surface area of the sample, was taken as the lead elution B.

The X-ray absorption coefficient ($\mu$ value) at a wavelength of 0.6 Å, was obtained by calculation from the glass composition, the glass density and the mass absorption coefficient of each component.

The softening point and the thermal expansion coefficient ($\alpha$) were measured in accordance with JIS R3104 and JIS R3102, respectively.

The devitrification temperature was measured as follows. Namely, each sample was pulverized and glass particles of from about 2 to 3 mm were selected, washed and dried. Then, the glass particles were placed on a porous boat made of platinum. This platinum porous boat was put into a temperature gradient furnace of from 700 to 1,200° C. and heat-treated for 48 hours, and then the platinum porous boat was taken out and left to cool. The glass sample in the platinum porous boat was inspected by a polarization microscope to find out a portion where the transparency was lost due to precipitation of crystals in the glass and the boundary position of the portion where the transparency was not lost, and the temperature within the electrically heating furnace corresponding to that boundary position was determined and taken as the devitrification temperature.

In Table 1, the lead elution A (unit: $\mu g/cm^2$), the lead elution B (unit: $\mu g/cm^2$), the PbO ratio calculated from the composition represented by wt % =(PbO content)/(total amount of PbO, SrO, BaO, CaO and MgO), the $\mu$ value (unit: $cm^{-1}$), the softening point (unit: ° C.), the thermal expansion coefficient $\alpha$ (unit: $10^{-7}$/° C.) and the devitrification temperature (unit: ° C.) are shown.

Examples 1 to 9 in Table 1 represent working Examples of the present invention, and Examples 10 and 11 represent Comparative Examples. Example 11 represents a typical funnel glass (conventional glass) which is presently produced.

TABLE 1

|  | Ex. 1 | Ex. 2 | Ex. 3 | Ex. 4 | Ex. 5 | Ex. 6 |
|---|---|---|---|---|---|---|
| $SiO_2$ | 53.2 | 54.7 | 54.5 | 52.6 | 52.1 | 50.3 |
| $Al_2O_3$ | 0.7 | 0 | 0 | 1.5 | 1.9 | 0.5 |
| $Na_2O$ | 6.5 | 7.1 | 6.5 | 6.0 | 7.4 | 6.2 |
| $K_2O$ | 6.9 | 5.4 | 6.6 | 7.0 | 7.1 | 8.0 |
| PbO | 17.8 | 14.3 | 16.2 | 18.5 | 19.9 | 15.9 |
| SrO | 5.5 | 11.6 | 8.0 | 4.5 | 2.0 | 4.4 |
| BaO | 5.3 | 4.1 | 4.2 | 5.0 | 4.1 | 10.9 |
| CaO | 0.9 | 0.4 | 0.1 | 0.1 | 2.8 | 1.5 |
| MgO | 1.6 | 1.0 | 2.7 | 4.0 | 0 | 0 |
| ZnO | 0 | 0 | 0 | 0 | 0.s | 0 |
| $ZrO_2$ | 1.4 | 1.1 | 1.2 | 0.5 | 2.0 | 2.0 |
| $TiO_2$ | 0.1 | 0 | 0.2 | 0.1 | 0 | 0.2 |
| $Sb_2O_3$ | 0.2 | 0.2 | 0.1 | 0.2 | 0.2 | 0.1 |
| PbO ratio | 0.57 | 0.45 | 0.52 | 0.58 | 0.69 | 0.49 |
| Lead elution A | 0.6 | 1.0 |  |  |  |  |
| Lead elution B | 3.0 | 3.2 | 3.6 | 3.5 | 2.1 | 2.7 |
| $\mu$ value | 66 | 66 | 65 | 66 | 66 | 65 |
| Softening point | 665 | 668 | 663 | 664 | 663 | 664 |
| $\alpha$ | 96 | 96 | 97 | 97 | 96 | 98 |
| Devitrification temperature | 830 | 980 |  |  |  |  |

TABLE 2

|  | Ex. 7 | Ex. 8 | Ex. 9 | Ex. 10 | Ex. 11 |
|---|---|---|---|---|---|
| $SiO_2$ | 51.2 | 55.5 | 53.0 | 51.0 | 51.4 |
| $Al_2O_3$ | 0.5 | 0.5 | 2.5 | 5.3 | 4.6 |
| $Na_2O$ | 6.2 | 7.5 | 8.4 | 6.5 | 6.6 |
| $K_2O$ | 8.1 | 7.4 | 6.0 | 7.2 | 7.6 |
| PbO | 18.5 | 19.7 | 20.1 | 20.6 | 22.9 |
| SrO | 2.1 | 2.0 | 2.0 | 1.7 | 0.5 |
| BaO | 6.3 | 3.1 | 3.0 | 5.3 | 0.6 |
| MgO | 3.0 | 1.4 | 2.7 | 0.6 | 1.8 |
| CaO | 1.5 | 0 | 0 | 1.2 | 3.8 |
| ZnO | 0.3 | 0 | 0 | 0 | 0 |
| $ZrO_2$ | 2.0 | 2.6 | 2.0 | 0 | 0.2 |
| $TiO_2$ | 0 | 0 | 0 | 0 | 0 |
| $Sb_2O_3$ | 0.3 | 0.3 | 0.3 | 0.3 | 0.2 |
| PbO ratio | 0.59 | 0.75 | 0.72 | 0.70 | 0.78 |
| Lead elution A |  |  |  | 1.3 | 1.2 |
| Lead elution B | 3.9 | 2.3 | 2.6 | 4.8 | 4.6 |
| $\mu$ value | 65 | 65 | 65 | 65 | 65 |
| Softening point | 670 | 659 | 659 | 667 | 664 |
| $\alpha$ | 97 | 96 | 96 | 96 | 97 |
| Devitrification temperature |  |  |  | 870 | 916 |

According to the present invention, it is possible to present a funnel glass for a cathode ray tube, which has a high X-ray absorption coefficient at a wavelength of 0.6 Å and whereby elution of lead in the glass into water is little as compared with a conventional funnel glass for cathode ray tubes.

What is claimed is:

1. A funnel glass containing PbO for a cathode ray tube, wherein when the composition is represented by wt % based on oxides, the content of SrO is at least 1.0 wt %, the content of BaO is at least 1.0 wt %, the content of $ZrO_2$ is at least 0.3 wt %, the content of $Na_2O$ is at least 3 wt %. and content of $K_2O$ is at least 3 wt %, and whereby the lead elution B of the glass as measured by the following method B is at most 4.0 $\mu g/cm^2$, and the X-ray absorption coefficient at a wavelength of 0.6 Å is at least 40 $cm^{-1}$:

Method B: The glass is immersed in distilled and deionized water at 90° C. for 20 hours, whereupon the glass is taken out, concentrated nitric acid is added to this distilled and deionized water and then the amount of lead is measured by inductively coupled plasma emission spectrometry, and the measured value of the amount of lead is divided by the surface area of the glass, and the product is taken as the lead elution B.

2. The funnel glass for a cathode ray tube according to claim 1, of which the composition as represented by wt % based on oxides, consists essentially of the following components:

| | |
|---|---|
| $SiO_2$ | 45 to 60 wt %, |
| $Al_2O_3$ | 0 to 6 wt %, |

-continued

| | |
|---|---|
| $Na_2O$ | 3 to 11 wt %, |
| $K_2O$ | 3 to 11 wt %, |
| PbO | 5 to 24 wt %, |
| SrO | 1 to 14 wt %, |
| BaO | 1 to 21 wt %, |
| CaO | 0 to 5 wt %, |
| MgO | 0 to 5 wt %, |
| ZnO | 0 to 2 wt %, |
| $ZrO_2$ | 0.3 to 4 wt %, |
| $TiO_2$ | 0 to 0.9 wt %, |
| $Sb_2O_3$ | 0 to 1 wt %. |

3. The funnel glass for a cathode ray tube according to claim 1, wherein the content of SrO is at least 1.5 wt %, and the content of BaO is at least 1.5 wt %.

4. The funnel glass for a cathode ray tube according to claim 1, wherein the content of SrO is at least 2.0 wt %, and the content of BaO is at least 2.0 wt %.

5. The funnel glass for a cathode ray tube according to claim 1, wherein the content of $B_2O_3$ is 0.

6. The funnel glass for a cathode ray tube according to claim 1, which has a softening point of at most 680° C.

7. The funnel glass for a cathode ray tube according to claim 1, wherein the content of $Na_2O$ is from 3 to 11 wt %.

8. The funnel glass for a cathode ray tribe according to claim 1, wherein the content of $K_2O$ is from 3 to 11 wt %.

9. The funnel glass for a cathode ray tube according to claim 1, wherein the content of $CeO_2$ is 0.

* * * * *